US009798130B2

(12) United States Patent
Dresel et al.

(10) Patent No.: US 9,798,130 B2
(45) Date of Patent: Oct. 24, 2017

(54) MEASURING TOPOGRAPHY OF ASPHERIC AND OTHER NON-FLAT SURFACES

(71) Applicant: Zygo Corporation, Middlefield, CT (US)

(72) Inventors: Thomas Dresel, Nuremberg (DE); Jan Liesener, Middletown, CT (US); Peter J. de Groot, Middletown, CT (US)

(73) Assignee: Zygo Corporation, Middlefield, CT (US)

( * ) Notice: Subject to any disclaimer, the term of this patent is extended or adjusted under 35 U.S.C. 154(b) by 160 days.

(21) Appl. No.: 14/592,437

(22) Filed: Jan. 8, 2015

(65) Prior Publication Data

US 2015/0192769 A1    Jul. 9, 2015

Related U.S. Application Data

(60) Provisional application No. 61/925,570, filed on Jan. 9, 2014.

(51) Int. Cl.
*G01B 11/02* (2006.01)
*G02B 21/36* (2006.01)
(Continued)

(52) U.S. Cl.
CPC ....... *G02B 21/367* (2013.01); *G01B 9/02072* (2013.04); *G01B 9/02085* (2013.01);
(Continued)

(58) Field of Classification Search
CPC .... G02B 21/367; G02B 21/008; G02B 21/26; G01B 9/02085; G01B 9/02072;
(Continued)

(56) References Cited

U.S. PATENT DOCUMENTS

| 5,960,379 A | 9/1999 | Shimizu et al. |
| 5,987,189 A | 11/1999 | Schmucker et al. |

(Continued)

FOREIGN PATENT DOCUMENTS

| CN | 1784587 | 6/2006 | ............... G01B 9/02 |
| JP | 2-259509 | 10/1990 | ............. G01B 11/24 |

(Continued)

OTHER PUBLICATIONS

Supplementary European Search Report for European Application Serial No. 15735227.9 dated Oct. 19, 2016 (4 pages).

(Continued)

*Primary Examiner* — Tarifur Chowdhury
*Assistant Examiner* — Jonathon Cook
(74) *Attorney, Agent, or Firm* — Fish & Richardson P.C.

(57) ABSTRACT

Generating a composite image of a non-flat surface includes: acquiring, using a microscope, multiple images of different areas of the non-flat surface, where each image includes a region of overlap with at least one adjacent image, the microscope having sufficient resolution to image in three dimensions a microstructure on the non-flat surface having a lateral dimension of 10 microns or less and a height of 10 nm or less; determining, for each of the images, a set of rigid body parameters relating a position and orientation of the test object in the image to a common coordinate system, where the set of rigid body parameters is determined by fitting the resolved microstructure in the overlap region in the image with the corresponding microstructure in the overlap region of the adjacent image; and combining the images based on the sets of rigid body parameters to generate a composite image.

45 Claims, 8 Drawing Sheets

(51) Int. Cl.
| | |
|---|---|
| G02B 21/26 | (2006.01) |
| G02B 21/00 | (2006.01) |
| G01B 9/02 | (2006.01) |
| G01B 9/04 | (2006.01) |
| G01B 11/24 | (2006.01) |
| G01B 11/25 | (2006.01) |
| G01M 11/02 | (2006.01) |

(52) U.S. Cl.
CPC ............ *G01B 9/04* (2013.01); *G01B 11/2441* (2013.01); *G01B 11/2522* (2013.01); *G01M 11/025* (2013.01); *G01M 11/0271* (2013.01); *G02B 21/008* (2013.01); *G02B 21/26* (2013.01); *G01B 2210/52* (2013.01)

(58) Field of Classification Search
CPC .. G01B 9/04; G01B 11/2441; G01B 11/2522; G01B 2210/52; G01M 11/025; G01M 11/0271; G01M 11/005; G01M 11/0214
USPC ............... 356/450, 479, 497, 513, 514, 515
See application file for complete search history.

(56) References Cited

U.S. PATENT DOCUMENTS

| | | | |
|---|---|---|---|
| 6,195,168 B1 | 2/2001 | de Lega et al. | |
| 6,250,777 B1 | 6/2001 | Aoyama | |
| 6,956,657 B2 | 10/2005 | Golini et al. | |
| 7,106,454 B2 | 9/2006 | de Groot et al. | |
| 7,271,918 B2 | 9/2007 | de Groot et al. | |
| 8,120,781 B2 | 2/2012 | Liesener et al. | |
| 8,126,677 B2 | 2/2012 | de Groot et al. | |
| 8,300,233 B2 | 10/2012 | Deck et al. | |
| 8,379,218 B2 | 2/2013 | Deck et al. | |
| 2003/0117632 A1* | 6/2003 | Golini ................. | G01B 11/255 356/512 |
| 2004/0189999 A1 | 9/2004 | de Groot et al. | |
| 2006/0126079 A1 | 6/2006 | Bareket et al. | |
| 2006/0158659 A1 | 7/2006 | Colonna de Lega et al. | |
| 2006/0221350 A1 | 10/2006 | Murphy et al. | |
| 2009/0091566 A1* | 4/2009 | Turney ................. | G02B 21/006 345/419 |
| 2012/0140243 A1 | 6/2012 | Colonna de Lega | |
| 2013/0044332 A1 | 2/2013 | Liang | |

FOREIGN PATENT DOCUMENTS

| | | | |
|---|---|---|---|
| JP | 2001-66123 | 3/2001 | ............ G01B 11/24 |
| JP | 2007-515641 | 6/2007 | ............ G01B 11/00 |
| JP | 2013-145199 | 7/2013 | ............... G01B 9/02 |
| TW | 200940948 | 10/2009 | ............ G01B 11/30 |
| TW | 201310002 | 3/2013 | ............ G01B 11/24 |
| TW | 201312094 | 3/2013 | ............. G01N 21/45 |
| WO | WO 2004/079295 | 9/2004 | ............... G01B 9/02 |
| WO | WO 2005/065091 | 7/2005 | |

OTHER PUBLICATIONS

Murphy, Paul E., et al., "High precision metrology of domes and aspheric optics", *Proceedings of SPIE*, vol. 5786, pp. 112-121 (May 18, 2005).
International Preliminary Report on Patentability and Written Opinion of the International Searching Authority for International Application No. PCT/US2015/010628 Dated Jul. 21, 2016.
Taiwan Notice of Allowance and Search Report for Taiwan Application No. 104100683 dated Jul. 25, 2016 (3 pages).
Written Opinion of the International Searching Authority for International Application No. PCT/US2015/010628 dated Apr. 23, 2015.
International Search Report and Written Opinion for International Application No. PCT/US2015/010628 dated Apr. 23, 2015.
H. Kikuta, and K. Iwata, "Phase-shifting common-path interferometers using double-focus lenses for surface profiling," in Intl Symp on Optical Fabrication, Testing, and Surface Evaluation, edited by J. Tsujiuchi, *Proc. of SPIE*, vol. 1720, pp. 133-141 (Oct. 1992).
Peter de Groot, "Coherence Scanning Interferometry," *Optical Measurement of Surface Topography*, edited by R. Leach, Chapter 9, pp. 187-208, (Springer Verlag, Berlin, 2011).
Peter de Groot, "Design of error-compensating algorithms for sinusoidal phase shifting interferometry", *Applied Optics*, vol. 48, No. 35, pp. 6788-6796 (Dec. 10, 2009).
Yu Jian Fan, "Stitching Interferometry for Accurate Measurement of Curved Surfaces" Ph.D. Dissertation, Technische Universiteit Eindhoven (1998) (127 pages).
Klaus Freischlad, "Sub-Angstrom surface metrology with a virtual reference interferometer", *Proc. of Spie*, vol. 8493, pp. 84930B-1-84930B-14, 2012.
Michael F. Küchel, "Interferometric measurement of rotationally symmetric aspheric surfaces," Proc. SPIE 7389, pp. 738916-1-738916-34 (2009).
M. V. Mantravadi et al., "Newton, Fizeau, and Haidinger Interferometers," *Optical Shop Testing*, edited by Daniel Malacara, Chapter 1, pp. 361-394, (Wiley-Interscience, a John Wiley & Sons, Inc., Publication) (2007).
Horst Schreiber et al., "Phase Shifting Interferometry," *Optical Shop Testing*, edited by Daniel Malacara, Chapter 14, pp. 547-666, (Wiley-Interscience, a John Wiley & Sons, Inc., Publication) (2007).
M. Strojnik et al., "Lateral Shear Interferometers," *Optical Shop Testing*, edited by Daniel Malacara, Chapter 4, pp. 122-184, (Wiley-Interscience, a John Wiley & Sons, Inc., Publication) (2007).
Shouhong Tang et al., "Stitching: High Spatial resolution microsurface measurements over large areas", Proc. SPIE, vol. 3479, pp. 43-49, Jul. 1998.
Yu Zhou et al., "Self calibration for slope-dependent errors in optical profilometry by using the random ball test", *Proc. of SPIE*, vol. 8493, pp. 84930H-1-84930H-8 (2012).
European Patent Office Communication dated Dec. 8, 2016 (7 pages).
Taiwan Office Action for Taiwan Patent Application No. 105127398 dated Apr. 13, 2017.
Japanese Office Action for Japanese Application No. 2016-545928 dated Jun. 27, 2017.
Singapore Search Report and Written Opinion for Singapore Application No. 11201605108V dated Aug. 24, 2017.

* cited by examiner

MEASURING TOPOGRAPHY OF ASPHERIC AND OTHER NON-FLAT SURFACES

CROSS-REFERENCE TO RELATED APPLICATION

This application claims benefit to Provisional Patent Application No. 61/925,570, filed on Jan. 9, 2014. The entire content of the provisional application is incorporated herein by reference.

TECHNICAL FIELD

The present disclosure relates to measuring topography of aspheric and other non-flat surfaces.

BACKGROUND

The manufacture and sale of mobile devices that utilize miniaturized cameras (e.g., mobile phones) has increased markedly in recent years. Such cameras typically require lens assemblies that include small aspheric lenses. Aspheric lenses include lenses where one or both surfaces have a shape that is neither spherical nor cylindrical. The aspheric lenses can be produced in large quantities using diamond turning of molds and then injection molding to make plastic copies of these molds. Current industry practice includes measuring the molds and lenses using mechanical coordinate measuring machines (CMMs).

SUMMARY

Optical measurement of aspheric lens surfaces (and of other non-flat surfaces), such as those found in mobile phone lens assemblies, can be very challenging: many of the aspheric surfaces currently used in mobile phone lens assemblies have gull-wing or pancake shapes. Due to their high surface slopes and/or relatively large surface areas, such lenses cannot be adequately profiled by conventional optical metrology techniques. Though techniques such as fringe projection systems, coherence scanning interferometry, phase-shifting interferometry, wave front sensors such as Shack-Hartmann sensors, or shearing interferometers can deliver aerial 2½-d measurements of surface topography, systems based on those techniques have a limited field of view as well as a limited slope acceptance range. The term "2½-d measurements" here refers to measurements that assign one measurand, e.g. a height value, to each point of a given grid of lateral positions. In an optical profiler, for example, the slope capability is limited, among other factors, by the acceptance aperture of the imaging system. Typically this is only a few degrees even for a small field of view of 1 mm. Many surfaces exceed either the field of view or the slope range of the instruments or both. The task of optical profiling of aspheric surfaces for mobile devices is further complicated since it is often necessary to provide relational measurements between the aspheric surfaces and surrounding auxiliary surfaces that are used for stacking and aligning the aspheres in the lens assemblies. In some cases, the field of view of an optical profiling system can be extended but at the expense of narrowing the slope acceptance and vice-versa. The most challenging surfaces demand both large fields and high acceptance angles such that a single aerial measurement is generally not sufficient to measure the entire surface.

By reducing the field of view of the instrument and extending the slope range, it is possible to find a compromise in which continuous patches of data on the surface of the test object, corresponding to a filled field of view of the camera, are measured. Provided there is enough overlap between these measured surface-patches, the multiple views of the surface can be fused together in software, thereby increasing the field of view of the instrument. Even so, complications with profiling a non-flat surface may still arise if the surface slopes are steep and/or the surface is very smooth. In particular, with steep slopes, it is difficult and expensive to provide accurate coordinates for the relative translation and/or rotation of the test object in applications that have tight measurement uncertainty requirements. Additionally, matching errors of even a few nanometers between features on adjacent surface-patches may cause substantial errors. This is especially a concern in cases where the surface being measured has low roughness (e.g., polished surfaces without any defects), since the absence of any defects, such as scratches, that can be used as position markers makes determining the orientation of adjacent images difficult.

The subject matter of the present disclosure addresses the foregoing issues by combining an areal-surface topography microscope having high resolution with staging that enables relative motion of the test object along up to 6 degrees of freedom and over a large angular range (e.g., tip-tilt range of about 30° or more) relative to the microscope. An electronic processor in communication with the microscope combines multiple three-dimensional images of different areas of a test object's surface into a single larger image of the surface. With the large angular range and additional degrees of freedom provided by the staging, the slope acceptance of the imaging system can be increased for non-flat test object surfaces. Furthermore, due to the high lateral resolution of the microscope, overlapping images of even polished surfaces can be combined by identifying common high-frequency surface features (e.g. surface features having spatial frequencies on the order of the inverse resolution of the imaging system). Indeed, in some cases, a final composite image of the test object can be obtained without requiring ultra-precise staging coordinates. In addition, careful calibration and compensation of the images and/or system ensures accurate matching of the high-frequency features.

In general, in some aspects, the subject matter of the present disclosure can be embodied in an apparatus that includes an areal topography-measuring microscope, mechanical staging for adjusting position and orientation of a test object with respect to the topography measuring microscope, and a data processing unit. The topography-measuring microscope has sufficient lateral resolution to view both the surface form, microstructure of curved surfaces, and/or waviness of the surfaces. Microstructure is in the topography regime normally associated with surface roughness and texture.

In other aspects, the subject matter of the present disclosure can be embodied in methods that include measuring the areal topography of a first portion or sub-aperture of a test object surface after positioning the test object within view of the microscope. Subsequently, the relative position and orientation of the test object is adjusted, using mechanical staging, with respect to the topography-measuring microscope. Next, the areal topography of a second portion or sub-aperture of the test object surface that is different from the first sub-aperture is measured. This process may be repeated for two or more sub-apertures, resulting in a library of sub-aperture topography measurements that are partly overlapping. In a next step, a data processing unit analyzes the partly-overlapping sub-aperture topography measurements to determine a set of rigid body parameters, using a method that minimizes in part the differences in microstructure topography between the sub-aperture measurements in the overlapping regions. Then, the data processing unit combines the set of rigid body parameters together with the sub-aperture topography images to create a final three-dimensional (3D) surface topography map of the part surface.

In general, in another aspect, the subject matter of the disclosure can be embodied in methods that include: acquiring, using the microscope, multiple images of different areas of a non-flat surface of a test object, where each image includes a region of overlap with at least one adjacent image, the microscope having sufficient resolution to image in three dimensions a microstructure on the non-flat surface having a lateral dimension of 10 microns or less and a height of 10 nm or less; determining, for each of the images, a set of rigid body parameters relating a position and an orientation of the test object in the image to a common coordinate system, where the set of rigid body parameters is determined by fitting the resolved microstructure in the overlap region in the image with the corresponding microstructure in the overlap region of the adjacent image; and combining the plurality of images based on the sets of rigid body parameters to generate a composite image of the surface.

In general, in another aspect, the subject matter of the disclosure can be embodied in systems that include: a microscope, the microscope having a resolution sufficient to image in three dimensions a microstructure on a non-flat surface of a test object, the microstructure having a lateral dimension of 10 microns or less and a height of 10 nm or less; a stage for arranging the test object relative to the microscope, the stage having at least one rotational degree of freedom relative to the microscope and having an angular range of 10° or more for varying an angular orientation of the test object relative to the microscope; and an electronic processor in communication with the microscope, in which the microscope acquires, during operation, multiple images of different areas of the non-flat surface, where each image comprises a region of overlap with at least one adjacent image and at least some of the images are acquired for different angular orientations of the test object with respect to the objective, and where the electronic processor is programmed to receive the images from the microscope and to determine, for each of the images, a set of rigid body parameters relating a position and orientation of the test object to a common coordinate system, where the set of rigid body parameters is determined by fitting the resolved microstructure in the overlap region in the image with the corresponding microstructure in the overlap region of the adjacent image, and to combine the plurality of images based on the sets of rigid body parameters to generate a composite image of the surface.

Various implementations of the apparatus, methods and system are possible. For example, in some implementations, the multiple images of different areas of the non-flat surface are three-dimensional images. In some implementations, the composite image is a three-dimensional image.

In some implementations, the areal surface topography microscope includes an optical instrument, referred to herein as an optical profiler, such as a phase shifting interferometry (PSI) microscope, a coherence-scanning interferometry microscope (CSI), a confocal microscope, a focus-scanning microscope, a digital holography microscope, a structured-illumination microscope, or a chromatic confocal microscope.

In some implementations, the microscope includes a stylus-type instrument capable of measuring areal surface topography as opposed to cross-sectional profiles.

In some implementations, the microscope includes an optical instrument configured to acquire data always at the position of best focus.

In some implementations, the microscope includes an optical instrument operating at visible wavelengths, or alternatively, at ultraviolet or infrared wavelengths.

In some implementations, the microscope is sensitive enough to measure features between 1 and 10 microns in width and between 0.1 and 10 nm in surface height. Such values are consistent with what is commonly understood as an optically smooth or polished surface at visible wavelengths from about 0.4 micron to 0.8 micron.

In some implementations, the microscope incorporates two or more sensing technologies, for example, to measure or detect microstructure using one technology, and surface form using another.

In some implementations, the staging has one axis of motion, for example rotation, or several, combining lateral displacements with rotational motions.

In some implementations, the staging adjusts only the part, only the microscope, or both the part and the microscope.

In some implementations, the staging incorporates additional metrology such as optical encoders or interferometers to improve precision.

In some implementations, the data processing relies on the microscope topography images, and not the stage position information, to generate final 3D surface maps.

In some implementations, the data processing relies on the microscope topography images together with stage position information to generate final 3D surface maps.

In some implementations, the methods include measuring separated surfaces and relating them to each other dimensionally. For example, the front with respect to the back surface of a transparent object, or the mounting surfaces with respect to an operational surface of the part.

In some implementations, the methods include one or more calibration steps to compensate for systematic errors.

In some implementations, the data processing includes a global fit of all measurements simultaneously.

In some implementations, the data processing includes a sequential fit of one measurement to the next, eventually resulting in a final 3D topography.

In some implementations, the data processing includes fits between pairs of overlapping measurements, the resulting rigid body parameters of which undergo a global optimization.

In some implementations, the test object surface topography includes flat surfaces, spherical surfaces, aspheric surfaces, and freeform surfaces.

In some implementations, the test object size is microscopic, having from about 0.1 mm to about 10 mm as a maximum size for any one dimension, or macroscopic, having about 10 mm to about 1000 mm as a maximum size for any one dimension.

In some implementations, the non-flat surface includes at least two locations having respective normals that form an angle greater than 20 degrees, greater than 30 degrees, greater than 45 degrees, or greater than 60 degrees.

In some implementations, the set of rigid body parameter include at least two translation coordinates and at least two angular coordinates.

In some implementations, the set of rigid body parameters include at least five coordinates.

In some implementations, the set of rigid body parameters include six coordinates.

In some implementations, the set of rigid body parameters are sufficient to relate the orientations of at least two locations of the non-flat surface to one another, in which the at least two locations have respective normals that form an angle greater than 10 degrees, greater than 20 degrees, greater than 30 degrees, greater than 45 degrees, or greater than 60 degrees.

In some implementations, the set of rigid body parameters include three orthogonal rotation angles.

In some implementations, the different areas of the multiple images of different areas of the non-flat surface include at least two locations having respective normals that form an angle greater than 10 degrees, greater than 20 degrees, greater than 30 degrees, greater than 45 degrees, or greater than 60 degrees. Acquiring the images with the microscope can include sequentially orienting that test object so that the locations have their respective normals substantially parallel to an axis of the microscope. The microscope can include a mount configured to hold the test object and orient it over a range of orientations sufficient to sequentially make normals of the locations substantially parallel to the axis of the microscope. In some implementations, the microscope and the stage are configured to orient the test object over a range of orientations sufficient to sequentially make normals of locations on the test object substantially parallel to the optical axis of the microscope. In some implementations, the microscope and stage are configured to translate the test object relative to each other between successive images of the multiple images of the different areas of the non-flat surface. The stage can include one or more actuators for translating the test object relative to the microscope. In some implementations, the microscope and stage are configured to rotate the test object relative to each other between successive images of the multiple images. The stage can include one or more actuators for rotating the test object relative to the microscope.

In some implementations, an area of the composite image is larger than a field of view of the microscope.

In some implementations, the test object is translated relative to the microscope for successive images.

In some implementations, the test object is rotated relative to the microscope for successive images.

In some implementations, the test object is rotated based on a curvature of the non-flat surface to orient a portion of the non-flat surface in a field of view of the microscope appropriately for imaging using the microscope.

In some implementations, a relative rotation of the test object for at least some of the images is 10° or more.

In some implementations, the non-flat surface has a RMS surface roughness of 1 nm or less.

In some implementations, the non-flat surface is an optically smooth surface.

In some implementations, the test object is an aspheric lens.

In some implementations, determining the set of rigid body parameters includes calibrating the multiple images of different areas of the non-flat surface prior to fitting resolved microstructure. Calibrating the multiple images can include acquiring, using the microscope, an image of a reference mirror, and subtracting the reference mirror image from each of the images of the areas of the non-flat surface. Acquiring the multiple images of the different areas of the non-flat surface can include detecting the images using a multi-element detector, in which calibrating the multiple images includes: detecting at the multi-element detector an image of a reference sample comprising a pre-defined periodic surface pattern; determining an error in a pixel pattern of the measured reference sample; and compensating each of the images for the error in the pixel pattern. Acquiring the multiple images of the different areas of the non-flat surface can include detecting the images using a multi-element detector, in which calibrating the multiple images includes, for each image: determining, for each pixel of the image, a surface slope along two orthogonal directions; calculating, for each pixel of the image, a corresponding retrace error function; and subtracting the retrace error function from the corresponding pixel in the image.

In some implementations, the methods include acquiring the multiple images of the different areas of the non-flat surface using an optical microscope.

In some implementations, the methods include acquiring the multiple images of the different areas of the non-flat surface using a coherence scanning interferometry microscope, a phase-shifting interferometry microscope, a confocal microscope, a focus-scanning microscope, a digital holography microscope, a structured-illumination microscope, or a chromatic confocal microscope.

In some implementations, acquiring the multiple images of the different areas of the non-flat surface includes using coherence scanning interferometry to obtain a topography map of each of the different areas of the non-flat surface.

In some implementations, acquiring the multiple images of the different areas of the non-flat surface include using a stylus to measure a topography map of each of the different areas of the non-flat surface.

In some implementations, determining the set of rigid body parameters includes applying a global fit of the resolved microstructure across the overlap regions of the images to obtain an optimized set of rigid body parameters for each image. Applying the global fit can include obtaining a best fit of the resolved microstructure across the overlap regions of the multiple images.

In some implementations, fitting the resolved microstructure in the overlap region in the image with the corresponding microstructure in the overlap region of the adjacent image is performed sequentially for a series of adjacent image pairs. For each adjacent image pair, the fitting results in an intermediate set of rigid body parameters relating a relative position and orientation of the test object between the images in the pair, and determining the set of rigid body parameters further can include performing a global optimization to obtain a final set of rigid body parameters that best matches the intermediate sets of parameters.

In some implementations, the microscope includes a multi-element detector for detecting the multiple images of the different areas of the non-flat surface, in which the processor is configured to calibrate the multiple images detected by the multi-element detector.

In some implementations, the electronic processor is programmed to apply a global fit of the resolved microstructure across the overlap regions of the multiple images to obtain an optimized set of rigid body parameters for each image. The electronic processor can be programmed to obtain a best fit of the resolved microstructure across the overlap regions of the multiple images.

In some implementations, the electronic processor is programmed to sequentially fit the resolved microstructure in the overlap region in the image with the corresponding microstructure in the overlap region of the adjacent image for a series of adjacent image pairs, in which, for each adjacent image pair, the fitting results in an intermediate set of rigid body parameters relating a relative position and orientation of the test object between the images in the pair, and in which the electronic processor is further programmed to perform a global optimization to obtain a final set of rigid body parameters that best matches the intermediate sets of parameters.

In some implementations, the microscope includes a first sensor configured to detect the microstructure and a second sensor configured to detect a surface form of the test object.

The details of one or more embodiments are set forth in the accompanying drawings and the description below. Other features and advantages will be apparent from the description, drawings, and claims.

DETAILED DESCRIPTION

To image test objects having surface regions exhibiting high curvature, the slope acceptance of an areal surface topography microscope such as an optical profiler can be extended by reducing the profiler field of view. If the test object also has a surface area that is larger than the reduced field of view, then an image of the entire test object surface may be obtained by imaging multiple regions with the reduced field of view ("surface-patches" or "sub-apertures") and fusing together the measured images using an electronic processor, thereby artificially increasing the field of view of the instrument.

Obtaining the measurements of the different sub-aperture images of the test object involves manipulating the test object relative to the sensor head of the microscope such that different positions on the surface of the test object are measured with proper sensor orientation with respect to the surface. With proper staging and dedicated reconstruction algorithms, this approach can overcome the field of view and slope limitations associated with conventional optical profiler techniques; even surface geometries that extend beyond hemispheres may become measurable with an instrument that only delivers 2½-d data.

Figure 1:
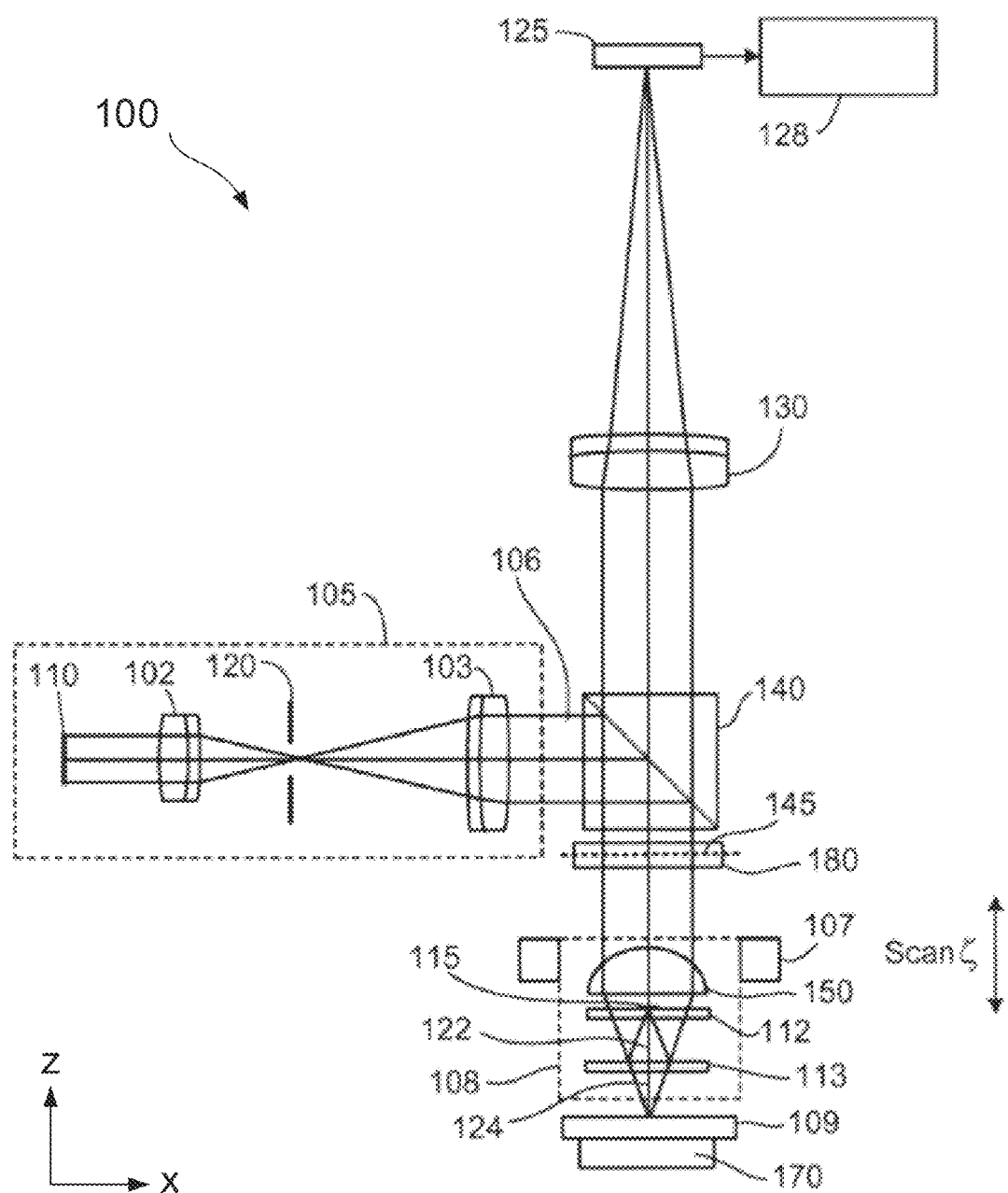
FIG. 1 is a schematic illustrating an example of a coherence scanning microscope.

An example of this principle can be described using an interference microscope, such as the CSI microscope 100 shown in FIG. 1. Interferometric imaging systems, such as the CSI microscope 100 in FIG. 1, combine measurement wavefronts reflected from a surface of interest with reference wavefronts reflected from a reference surface to produce an interference pattern. Spatial variations in the intensity profile of the interference pattern correspond to phase differences between the combined measurement and reference wavefronts caused by variations in the profile of the object surface relative to the reference surface. Based on the measured phase differences, interferometric imaging systems are used to measure surface topography and/or other characteristics of objects having complex surface structures, such as thin film(s), discrete structures of dissimilar materials, or discrete structures that are under-resolved by the optical resolution of an interference microscope.

An optical path length difference (OPD) between the reference and measurement legs of the imaging system is scanned to produce a scanning interferometry signal for each camera pixel. The interference pattern produced across the camera for a particular point in time corresponds to an interferogram. In low coherence scanning interferometers, the optical path length difference is scanned over a range comparable to or larger than the coherence length of the interfering wavefronts. A limited coherence length can be produced in a scanning interferometric imaging system, for example, by using a white-light source, which is referred to as scanning white light interferometry (SWLI) or more generally, coherence scanning interferometry. A typical CSI signal is a few fringes localized near the zero OPD position. The signal is typically characterized by a sinusoidal carrier modulation (the "fringes") with bell-shaped fringe-contrast envelope. In CSI imaging systems, a position of best-focus typically corresponds to the peak or center of the fringe envelope, i.e., the position where the OPD is zero.

The CSI microscope 100 shown in FIG. 1 is a Mirau-type interferometric imaging system. For the purposes of this example, the y-axis in FIG. 1 is assumed to be normal to the page. A source module 105 provides illumination light 106 to a beam splitter 140, which directs it through polarization optics 180 to a Mirau interferometric objective assembly 108. Plane 145 corresponds to the pupil plane of the assembly 108. Assembly 108 includes a measurement objective lens 150, a reference flat 112 having a reflective coating on a small central portion thereof defining a reference mirror 115, and a beam splitter 113. During operation, objective lens 150 focuses the illumination light towards a test object 109 through reference flat 112. Beam splitter 113 reflects a first portion of the focusing light to reference mirror 115 to define reference light 122 and transmits a second portion of the focusing light to test object 109 to define measurement light 124. Then, beam splitter 113 recombines the measurement light reflected (or scattered) from test object 109 with reference light reflected from reference mirror 115, and objective 150 and imaging lens 130 image the combined light to interfere on detector 125 (e.g., a multi-element CCD or CMOS detector).

Detector 125 is a multiple element (i.e., multi-pixel) camera that independently measures the interference between the measurement and reference light corresponding to different points on the test object and reference mirror (i.e., to provide spatial resolution for the interference pattern). Detector 125 measures the intensity of the optical interference at one or more pixels of the detector as the relative position of the test object is being scanned and sends that information to a computer 128 for analysis. During analysis, computer 128 (or other system having an electronic processor) determines the wavelength-dependent, complex reflectivity of the test surface from the scanning interferometry signal. For example, the scanning interferometry signal at each detector element can be Fourier transformed to give the magnitude and phase of the signal with respect to wavelength. From the magnitude and phase information, the computer 128 obtains height information about the sample. The height information from each detector element then is included in a height/topography map for the imaged region.

Source module 105 includes a source 110 (e.g., a point source or spatially extended source), a telescope formed by lenses 102 and 103, and a stop 120 positioned in the back focal plane of lens 102 (which coincides with the front focal plane of lens 103). This arrangement images the source onto the pupil plane 145 of Mirau interferometric objective assembly 108, which is an example of Koehler illumination. The size of stop 120 controls the size of the illumination field on test object 109. In other embodiments, the source module may include an arrangement in which a source is imaged directly onto the test object, which is known as critical illumination.

Alternative scanning interferometric imaging systems include, for example, Michelson, and Linnik interference objectives. In contrast to the Mirau geometry, the reference beam path in both a Linnik type and Michelson type interference objectives is perpendicular to the test beam path. In the case of a Linnik, the beamsplitter that separates and recombines the test and reference beams is located prior to a measurement objective and a reference objective. In the case of a Michelson, the beamsplitter that separates and recombines the test and reference beams follows a single objective.

The scanning interferometric imaging systems may include any of the following features. In some embodiments, the light used to generate the scanning interferometry signal is based on a white light source, or more generally, a spectrally broadband light source. In other embodiments, the light source may be monochromatic light source, or more generally, a spectrally narrowband light source. Examples of light sources include light emitting diodes or lasers, arc lamps, and thermal sources, such as incandescent bulbs. Measurement interference objectives having various numerical aperture (NA) values may be used in the scanning interferometric imaging systems. For example, the interference objectives can define an NA between greater than about 0.01 to about 0.9. Examples of interference objectives that can be used include glass, oil/water immersion and solid immersion types. The light provided by the source can be unpolarized or polarized, including linear, circular, or structured polarized light. The light can be in the visible wavelengths, ultraviolet wavelengths, or infrared wavelengths of the electromagnetic spectrum. In some implementations, the interferometric imaging systems can include polarization optics to select a desired polarization for the light incident on, and emerging from the test object. Further description of scanning interferometric imaging systems can be found, e.g., in U.S. Pat. Nos. 7,106,454 and 7,271,918, each of which is incorporated herein by reference in its entirety.

Though a CSI microscope is shown in FIG. 1, other optical profilers also may be used. For example, the optical profiler may include a phase-shifting interferometry (PSI) microscope that uses PSI to image test objects, a confocal microscope, a focus-scanning microscope, a digital holography microscope that uses digital holography to image test objects, a structured-illumination microscope, or a chromatic confocal microscope. In some implementations, the microscope is a stylus-type instrument (e.g., an atomic force probe instrument), capable of using a stylus to measure areal surface topography as opposed to cross-sectional profiles. Preferably, the optical profiler used has sufficient resolution to image in three dimensions a microstructure on the test part surface having a lateral dimension of 10 microns or less and a height of 10 nm or less.

The CSI microscope 100 may be configured to position the test object relative to the microscope objective along 6 different degrees of motion. The different degrees of motion include piston (e.g., the offset between the test object and the objective along the z-axis), x-translation, y-translation, rotation, x-tilt, and y-tilt. In the interference microscope 100, piston motion can be achieved using an actuator/transducer (e.g., piezoelectric transducer (PZT)) 107 coupled to Mirau interferometric objective assembly 108. The actuator/transducer 107 is configured to scan assembly 108 as a whole relative to the test object 109 along the optical axis of objective 150 to provide scanning interferometry data at each pixel of the camera, where $\zeta$ is the scan coordinate and h is the relative height of the test object's surface. Alternatively, the actuator/transducer may be coupled to the stage 170 holding the test object rather than assembly 108 to provide the relative motion there between. In other embodiments, the scanning may be provided by a linear stage that moves the entire microscope relative to the test object along the optical axis of the objective. In yet further embodiments, the scanning may be provided by moving one or both of reference mirror 115 and beam splitter 113 relative to objective 150 along the optical axis of objective 150. Each of the transducers (e.g., the actuators/transducers attached to the CSI microscope 100 and the transducers attached to the stage 170) can be coupled to computer 128, such that computer 128 controls the speed and operation of the transducers.

Figure 2:
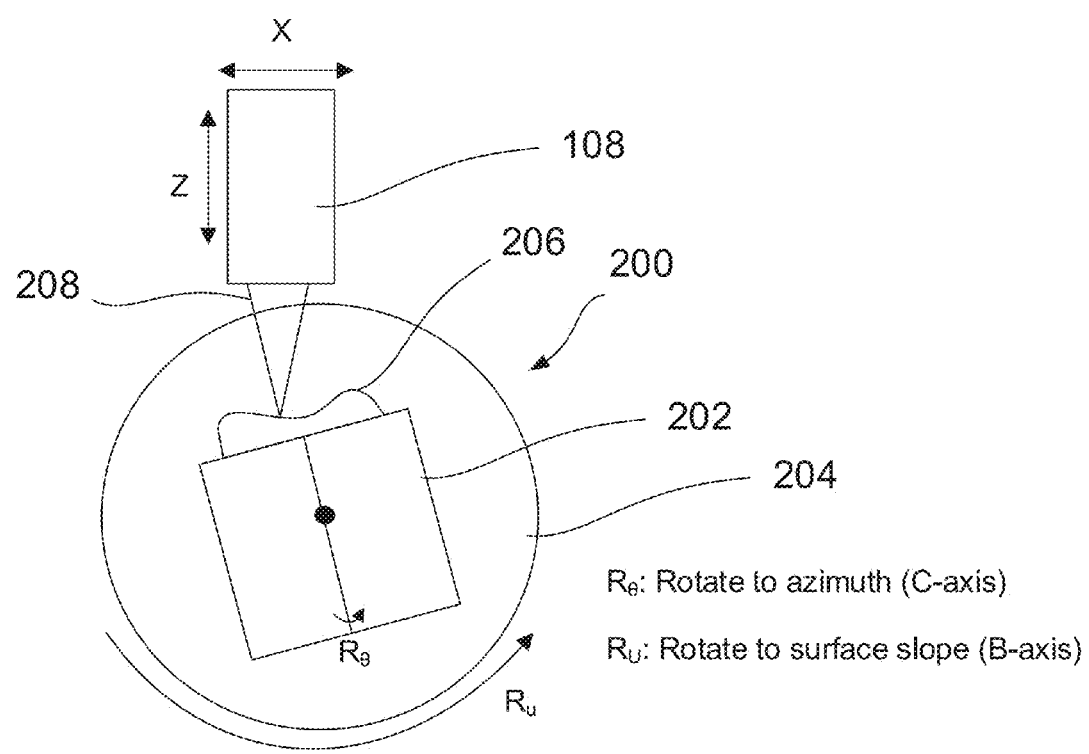
FIG. 2 is a schematic illustrating an example of stacked rotation stages underneath a microscope objective head.

The test object stage 170 may be configured to provide translation of the test object along other degrees of freedom. For example, in some implementations, the test object stage 170 may include a set of stacked stages, in which each stage enables movement of the test object along one or more different degrees of freedom. FIG. 2 is a schematic illustrating an example of stacked stages 200 for the case of measuring a rotationally symmetric surface sample 206, in which the stacked stages 200 and the sample mounted to the stages are situated beneath the microscope objective head 108 of the CSI microscope that illuminates the sample 206 with measurement light 208. As with FIG. 1, the x- and z-axes extend within the page, whereas the y-axis extends into and out of the page (i.e., along the normal to the page). The stacked stages 200 include a first inner stage 202 coupled to a second outer stage 204. The inner stage 202 allows rotating (Re) the part around its axis of rotation (C-axis, which extends in the plane of the schematic shown in FIG. 2, i.e., the line extending through the center of inner stage 202). The inner stage assembly 202 is mounted onto the outer rotation stage 204 which allows rotating ($R_u$) the normal of the current surface-patch being imaged by the CSI microscope 100 (around the B-axis, which is parallel to the y-axis extending out of the page in FIG. 2) so that the normal points into the sensor head 108. In some implementations, the assembly 200 includes a third stage that provides linear translation (e.g., along the x-axis and/or the y-axis) such that the head can address different radial positions on the test object. Each stage in the assembly (e.g., inner stage 202 and outer stage 204) can include a transducer for actuation.

In some implementations, as shown in FIG. 2, the microscope objective head 108 is configured so that it can be linearly translated along the x- and/or y-axes. For example, in some implementations, a transducer may be mounted to the objective head 108, in which the transducer is capable of translating the objective 108 along the x- and/or y-axis. The objective head 108 also can be moved along the z-axis to get the surface within the height capturing range of the instrument. Translation of the objective 108 along the z-axis may be provided by the same transducer that provides translation along the x- and/or y-axes. Alternatively, a separate transducer may be used. In general, the test object stage and/or microscope may be configured to image the test object along multiple degrees of freedom. Preferably, the stage has at least one rotational degree of freedom relative to the microscope and has an angular range of 10° or more for varying an angular orientation of the test object relative to the microscope. As explained further below, alternative staging geometries are possible for different applications.

With the microscope objective and test object capable of being positioned relative to one another along multiple degrees of freedom, the scanning microscope is then used to image multiple different surface-patches of the test sample. For example, with reference to microscope 100 of FIG. 1, after positioning the test object within view of the microscope 100, the areal topography of a first portion of the test object surface (the "first surface-patch") is imaged by obtaining a height map from the recorded interference data. The surface-patch image is obtained at a location corresponding to a position of best focus. In a next step, the staging adjusts the relative position and orientation of the part with respect to the objective head 108 of the CSI microscope 100 (e.g., so that the normal of local planar regions on the test object surface are oriented parallel to an optical axis of the objective 108). In a next step, the microscope measures the areal topography of a second surface-path that is different from the first surface-patch, in which the second surface-patch partly overlaps with the first surface-patch. The amount of overlap may vary and can include, for example, between about 10%-50% overlap of the two images. This process can be repeated for at least two surface-patches, resulting in a library of topography maps/surface-patch images. Once the surface-patch images are obtained, the computer 128 or other electronic processor combines (or "stitches") the surface-patches into a larger image. In particular, the computer 128 analyzes the topography measurements of each image to determine and refine a set of rigid body parameters.

Figure 6:
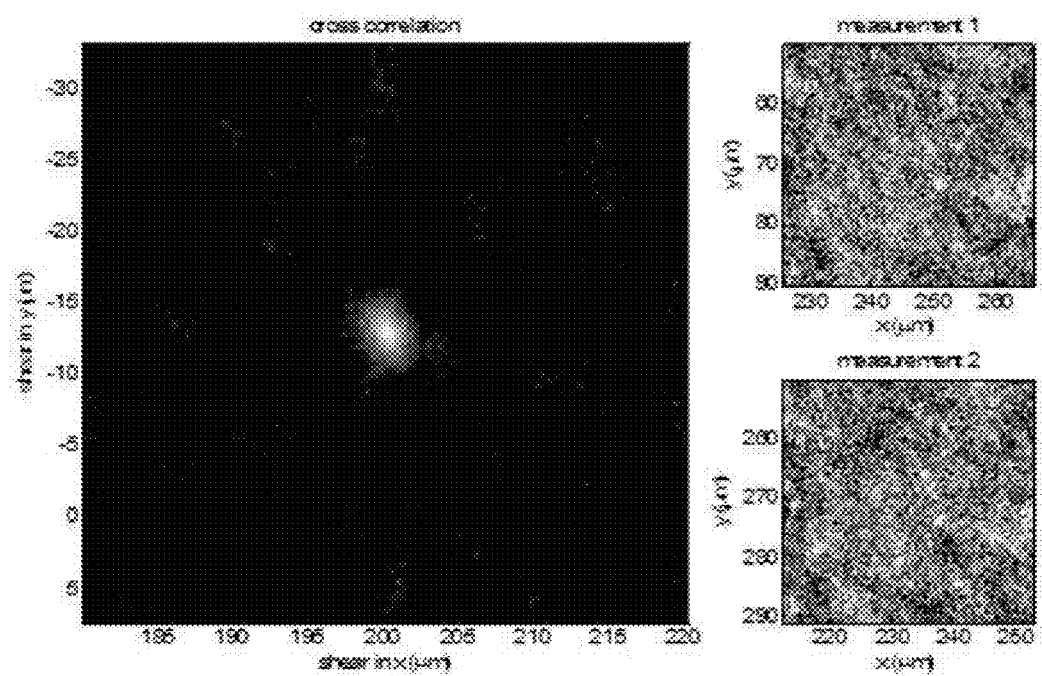
FIG. 6 is an experimental cross-correlation plot indicating the stitching fit quality for an actual test object sample.

The rigid body parameters relate a position and orientation of the test object in the image to a global coordinate system (e.g., the coordinate system in which the final stitched image is going to be represented). Refinement of rigid body parameters may be accomplished by applying linear or nonlinear fitting routines that iteratively modify rigid body parameters aiming at minimizing topographic differences in overlap regions between sub-aperture images. Alternatively, or as an intermediate step aiding the above fitting routine, rigid body parameters may be refined based on the outcome of correlation analyses between the high frequency content of overlapping sub-apertures (an example of the correlation outcome is shown in FIG. 6) potentially in combination with plane fitting routines. The rigid body parameters may include translation coordinates (e.g., x-, y-, and z-coordinates) and/or angular coordinates (e.g., pitch, yaw and roll). In some implementations, the rigid body coordinates include at least four coordinates (e.g., at least two translation coordinates and at least two angular coordinates). In some implementations, the rigid body coordinates include five coordinates (e.g., three translation coordinates and two angular coordinates). In some implementations, the rigid body coordinates include six coordinates (three translation coordinates and three angular coordinates). Implementations with a rigid body parameter set smaller than the full set of 6 parameters may rely on the staging to provide precise enough motion in one or more degrees of freedom. Based on the refined set of rigid body motion parameters, the computer 128 combines the sub-aperture topography images to create a final three-dimensional (3D) or 2½D surface topography map of the part surface.

In principle, provided the staging enables enough translational and rotational accuracy, one can fuse the data in computer memory without using stitching algorithms that require overlap of images. This approach may be feasible in applications where measurement uncertainty requirements are loose and/or in applications where other factors limit the achievable accuracy, e.g. if pixel sizes on macroscopic parts are say greater than or equal to about 100 μm. However, for applications that require tighter uncertainties, it becomes more and more difficult and increasingly expensive to provide the required coordinates by appropriate staging. For a particular microscope application, a pixel may be as small as 200 nm or even smaller, and matching errors of a few nm may be cosmetically problematic. If a stack of mechanical stages is to provide external coordinates to a fraction of this number, it becomes a technical challenge even for the most precise air bearing and encoder systems.

The inventors have observed that even the highest quality super-polished surfaces currently available show high-frequency surface texture. Thus, if the optical profiler (e.g., the interference microscope) has high enough resolution, it can detect this high-frequency surface texture and use it to provide a guide for stitching multiple views of the surface together without having to rely on ultra-precise coordinates from the staging, or even any coordinates from the staging. This can be done with sub-pixel accuracy using the computer 128 or other electronic processor. That is, the computer 128 identifies the same high-frequency feature in two or more adjacent sub-aperture images and uses the identified feature to determine an appropriate adjustment (e.g., translation, rotation, tip or tilt) of the adjacent images to obtain the best match for stitching the images together. For example, in some implementations, the microscope is sensitive enough to measure features between 1 and 10 microns in width and between 0.1 and 10 nm in surface height. Such values are consistent with what is commonly understood as an optically smooth or polished surfaces at visible wavelengths from about 0.4 micron to 0.8 micron. By using the form and high-frequency information from the surface of test object to assemble individual surface patches, the method can be completely self-referencing, i.e., information about the positioning/orientation of the staging may not be needed. Rather, just information obtained from the topography maps is used to reconstruct the scaffold that holds the individual surface maps together and describes the surface as a whole. In some implementations (e.g., when not relying on very small surface features to match topography images to one another), information about the stage positioning may still be used by the electronic processor in constructing the final surface map of the test object.

In some implementations, the microscope incorporates two or more sensing technologies. For example, to detect the high-frequency microstructure a first detecting technology is used, whereas a different detecting technology is used to detect the surface form, roughness and/or waviness of the test object. Examples of sensing technologies particularly sensitive to surface roughness include phase contrast microscopy, differential interference contrast microscopy, phase-modulation deflectometry, and focus sensing. Techniques well suited to surface form measurement include fringe projection microscopy and infrared scanning microscopy, in addition to the previously-mentioned optical profiler technologies. Further details of some of those technologies can be found, for example, in M. Pluta, "Specialized Methods," in Advanced Light Microscopy, Vol. 2, (Elsevier, Amsterdam, Warsaw, 1989), U.S. Patent App. Pub. No. 2012/0140243, entitled "NON-CONTACT SURFACE CHARACTERIZATION USING MOUDLATED ILLUMINATION" to X. Colonna De Lega, and U.S. Pat. No. 6,195,168, entitled "INFRARED SCANNING INTERFEROMETRY APPARATUS AND METHOD" to X. Colonna De Lega et al., each of which is incorporated herein by reference in its entirety. Information regarding surface form, roughness, texture and waviness can be found, for example, in the International Organization for Standardization (ISO) standards 25178, 4287, and 10110.

Figure 8:
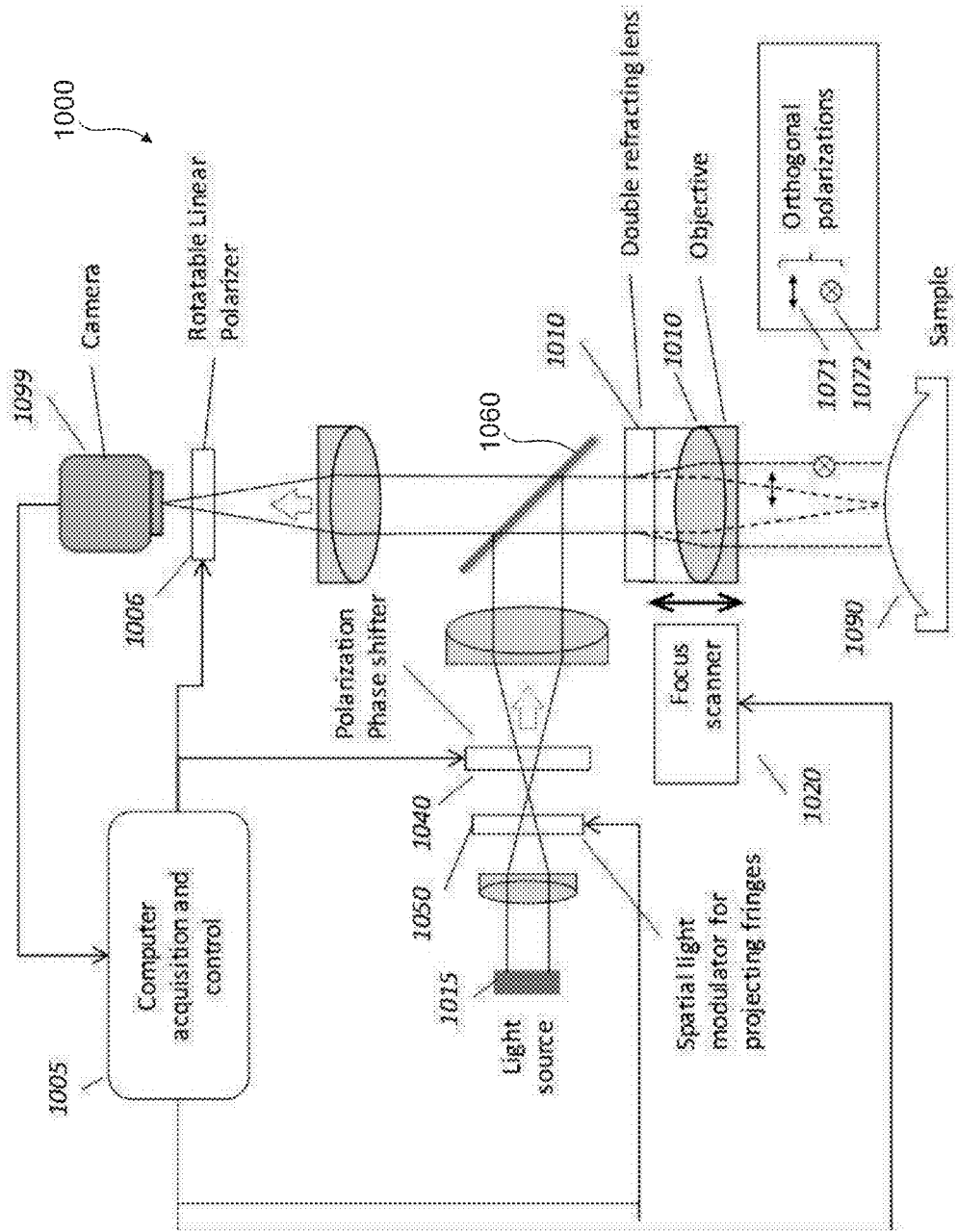
FIG. 8 is a schematic that shows an example of a system in which a double-refracting microscope for detecting microstructure is combined with a fringe project microscope for rapid measurement of overall form.

As an illustrative embodiment of a dual-sensor technology, FIG. 8 is a schematic that shows an example of a system in which a double-refracting microscope 1000 for detecting microstructure is combined with a fringe projection microscope for rapid measurement of overall surface form. FIG. 8 shows, among other features, a double-refracting lens 1010 oriented with its two birefringent axes in the plane and perpendicular to the plane of the figure, a linear polarizer 1006 that is rotatable under computer control, a spatial light modulator 1050, a focus scanner 1020, a light source 1015, a beam splitter 1060, and a polarization phase shifter 1040. There are two orientations indicated for linear polarization: in plane (1071) and out of plane (1072).

When operated as a fringe projection microscope, computer control 1005 rotates linear polarizer 1006 so that only beams having the in-plane polarization 1071 are passed to the camera and out-of-plane polarized beams 1072 are entirely rejected. During a focus scan of the objective 1010, computer control 1005 instructs spatial light modulator 1050 to create projected fringes on the sample 1090. The image of sample 1090 together with these projected fringes are detected by the camera 1099. Polarization phase shifter 1040 is inactive. The data acquisition and processing methodology for generating 3D form is detailed in published US patent application 2012/0140243 entitled "Non-contact surface characterization using modulated illumination" to X. Colonna De Lega. This methodology allows for rapid form measurement, usually faster than for CSI, but with insufficient height sensitivity to detect microstructure at low magnifications.

When operated as a microstructure-imaging system, computer control 1005 rotates linear polarizer 1006 to combine beams having polarizations both perpendicular (1072) and parallel (1071) to the figure. Camera 1099 thus simultaneously views two images, which interfere with each other, corresponding to two different focus configurations: one corresponding to precise imaging of the surface (the beam polarized as in 1071 within the plane of the figure) and the other entirely blurred (the beam polarized as in 1072 orthogonally to the plane of the figure). Computer control 1005 instructs polarization phase shifter 1040 to modulate the relative phase between the beams bearing the orthogonal polarizations 1071 and 1072, resulting in a modulated interference pattern at camera 1099. Data processing proceeds as described for example in the paper by H. Kikuta, and K. Iwata, "Phase-shifting common-path interferometers using double-focus lenses for surface profiling," in Intl Symp on Optical Fabrication, Testing, and Surface Evaluation, edited by J. Tsujiuchi (Proc. SPIE 1720, 133-141,October 1992), incorporated herein by reference in its entirety.

As indicated above, other optical sensing technologies can be used. However, coherence scanning interferometric (CSI) microscopy is well suited for the optical profiling process disclosed herein for at least the following reasons. First, CSI delivers 2½-dimensions measured against a flat which implies that no particular shape has been removed from the data optically as is typically the case in interferometers employing a spherical cavity. Second, by principle a CSI microscope measures each surface point always at best focus, which is known as the auto-focus property of CSI. In this way, part features are best resolved which is important for accurately capturing high spatial frequency features in particular. Third, CSI allows separating signals stemming from different interfaces which is very important when measuring transparent or semi-transparent samples (such as mobile phone lenses). Most optical techniques suffer severely from reflections coming from the back surface of the lens under test. Often this problem can only be overcome by coating the back surface with other materials and thereby frustrating the reflection. With CSI, the problem is elegantly solved by proper processing of the interference signals, which allows suppressing the back reflection without having to physically modify the sample under test. Moreover, the ability to collect information from different interfaces simultaneously can be a huge advantage over other mechanical because it allows performing relational measurements through the lens. As an example, the optical thickness of a lens can be measured from one side using CSI along the optical axis of the lens.

For stitching multiple views of the same surface, the individual maps should be as error free as possible before merging, so that the overlapping data regions are as conflict free as possible. To obtain highly accurate measurements, the optical profiler system should be carefully calibrated and compensated. Accordingly, one or more calibration steps should be followed to prepare the data before stitching the topography maps together. In the case of CSI, the microscope calibration can include, but is not limited to, calibration with respect to at least the following static error sources:

Reference mirror surface form errors: these errors can be characterized using a standard flat, possibly together with averaging techniques. First, a reference mirror topography map is obtained. Then, the reference mirror topography map is subtracted from the measured detector data to thereby eliminate the error from each CSI measurement.

Distortion errors/Lateral Calibration: distortion is a field-dependent but pupil-independent error that can be characterized by measuring a known periodic pattern (lateral calibration standard) such as, e.g., a strictly periodic grid of etched rectangular wells. From the data of such a pattern, the field dependent lateral shifts of the apparent pattern feature locations can be calculated and each subsequent CSI measurement can be corrected for these errors resulting in distortion free surface patches. Along with these calculations the lateral calibration of the instrument (i.e., the pixel spacing in object space or the magnification of the system) is determined as well.

Retrace errors: CSI microscopy is based on two-beam interferometry. It typically uses Mirau or Michelson interference objectives for the imaging of the part under test. When measuring surface patches including high slopes, these systems suffer from retrace errors: at non-zero slopes the interference violates the common path condition. This means that the measurement and reference beam travel along different paths through the optical system until they finally recombine on the camera to form the interference pattern. Optical path differences along these different paths directly enter the surface height result. Therefore, it can be important to characterize these retrace errors and to correct for them. The retrace errors depend on both the field and slope variables (since surface slope directly translates into chief ray inclination angles). That is, the retrace error functions is a four-dimensional function:

$$R=R(x,y,sx,sy)$$

where R represents the retrace error, x and y are the field coordinates and sx and sy are variables describing the surface slope. A variety of methods exist that can be used to characterize this four-dimensional function (see Yue Zhou, Young-Sik Ghimc, and Angela Davies, "Self calibration for slope-dependent errors in optical Profilometry by using the random ball test", Proc. of SPIE Vol. 8493 (2012), incorporated herein by reference in its entirety.). Once this function is known, each surface patch can be corrected. First, the surface data are differentiated numerically to calculate sx and sy for each pixel position (x,y). Subsequently, the retrace error function is subtracted from the measured surface map:

$$\tilde{S}(x, y) := S(x, y) - R\left(x, y, \frac{\partial S}{\partial x}, \frac{\partial S}{\partial y}\right)$$

In the foregoing equation S(x, y) is the measured surface map and $\tilde{S}(x, y)$ is the corrected surface map. An even more complete calibration of the instrument also considers retrace errors that result in the surface features appearing at laterally shifted locations, where the shift magnitude in the two lateral directions depends on the local slope and the field coordinates.

Figure 3:
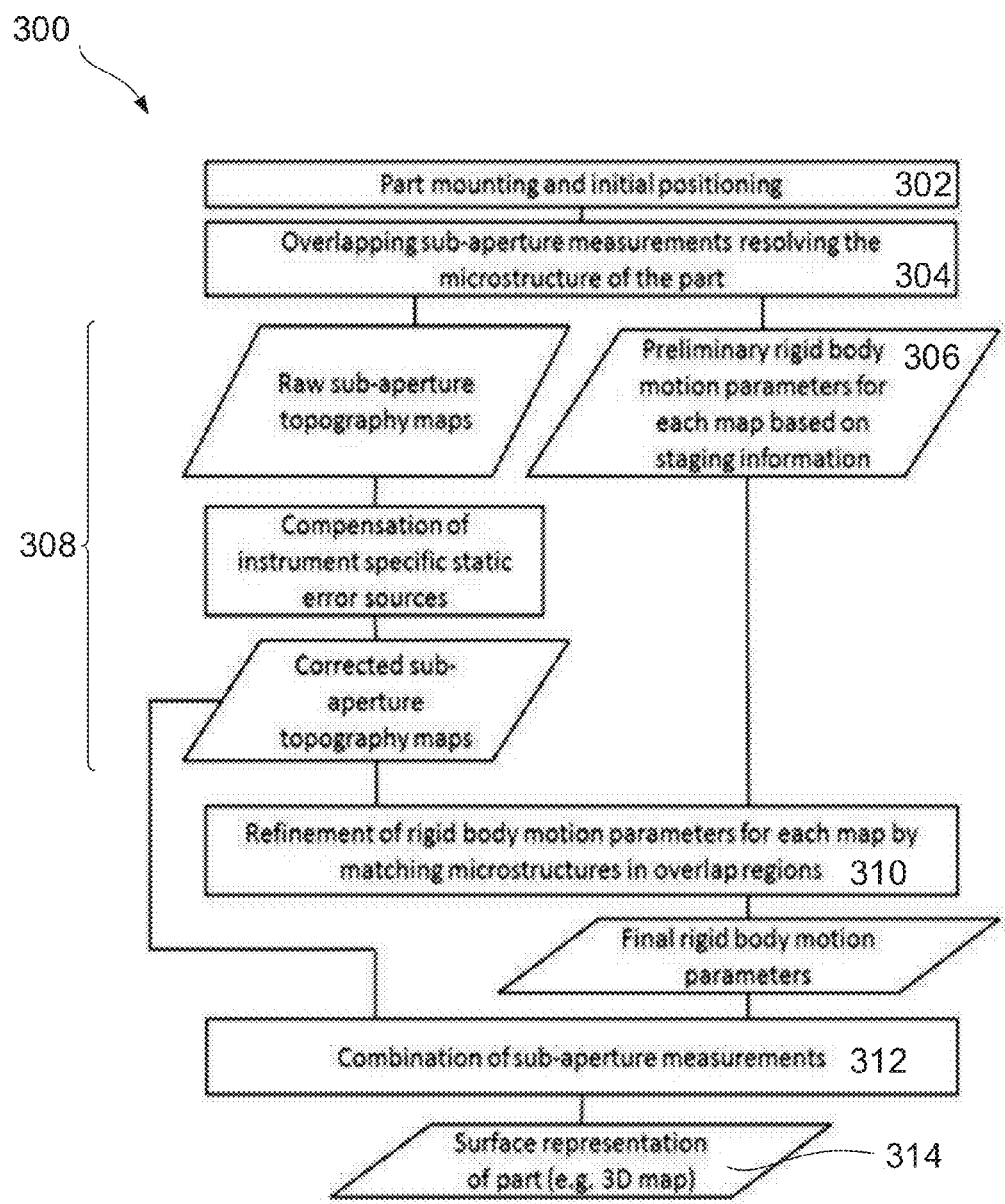
FIG. 3 is a flow-chart depicting the process flow 300 for imaging a test object and producing a 3D representation of the test object.

FIG. 3 is a flow-chart depicting the process flow 300 for imaging a test object and producing a 3D representation of the test object using an optical profiler such as the CSI microscope 100 of FIG. 1. In a first step (302), the process 300 includes mounting the test sample and initial positioning of the sample within the field of view of the microscope objective. Subsequently, multiple topography maps of different sub-aperture regions of the test sample are acquired (304) using the optical profiler, in which adjacent sub-aperture topography maps overlap one another. Acquiring the different topography maps entails modifying the relative translation and rotation of the test sample with respect to the optical profiler. For example, acquiring the images with the microscope may include sequentially orienting that test object so that the locations on the test object surface have their respective normals substantially parallel to an optical axis of the microscope. The computer 128 then obtains (306) preliminary rigid body motion parameters for each height map based on staging information (e.g., staging position coordinates associated with each sub-aperture image). The computer 128 also proceeds to calibrate (308) the height maps to obtain corrected sub-aperture topography maps using, e.g., one or more of the calibration procedures described above. In the example flow process shown in FIG. 3, the calibration procedure includes obtaining raw sub-aperture topography maps from the acquired images, compensating the raw topography maps for instrument specific static error sources, and then providing calibrated sub-aperture topography maps obtained following the error compensation. Using the calibrated height maps, the computer refines (310) the set of preliminary rigid body motion parameters for each sub-aperture map by matching (e.g., fitting) high frequency microstructures that occur in the overlapping regions of adjacent sub-apertures to obtain final rigid body motion parameters. Subsequently, the computer 128 combines (312) the corrected sub-aperture maps. The computer 128 then outputs (314), e.g., to a video screen, a final surface representation such as a 3D map of the test object.

Staging

As explained above in reference to FIG. 1, the test object may be mounted to a stage that provides motion along multiple degrees of freedom. As an alternative or in addition, the optical profiler may be configured to adjust the position of an objective/sensing head to obtain relative positioning between the test object and the profiler. In general, a variety of adjustable stages may be used. For example, in some embodiments, the stage may include a stacked set of individual stages, each of which provides motion along one or more degrees of freedom. The stages for the test object may include motorized linear stages, motorized rotation stages, and/or motorized vertical stages. The motorized stages may be coupled to actuators that drive the stage motion in response to a command received by an electronic processor (e.g., computer 128). The stages have a range sufficient to allow the microscope to scan across the entire test object surface. For example, the linear stages should be configured to provide a scan range from between about 0.1 mm to about 1000 mm as a maximum size for any one dimension (e.g., between about 0.1 mm to about 10 mm for microscopic objects or between about 10 mm to about 1000 mm for macroscopic objects). The minimum incremental motion of the linear translation stages can be in the range from about 0.0002 microns to about 100 microns (e.g., at least 0.01 micron, at least 0.05 micron, at least 0.1 micron, at least 1 micron, or at least 10 microns). The rotation stages also should provide sufficient rotation so that each surface-patch being mapped can be oriented to have its surface normal point into the sensor/objective head (e.g., is aligned with the optical axis of the objective). For example, the rotation stages should be configured to provide a rotational range of 10 degrees or more (e.g., up to 20 degrees, up to 30 degrees, up to 45 degrees, up to 90 degrees, up to 180 degrees, or up to 360 degrees). The minimum incremental rotation can be in the range from about 0.0002 degrees to about 1 degree (e.g., at least about 0.001 degree, at least about 0.01 degree, or at least about 0.1 degree).

In some implementations, the stage used for mounting the test object positions the object along one axis (e.g., rotation), along two axes (e.g., x-axis and roll (θz)), three axes (e.g., x- and y-axes and roll (θz)), four axes (e.g., x-, y-, z-axes, and roll (θz)), five axes (e.g., x-, y-, z-axes, and pitch (θx) and roll (θz)) or six axes (e.g., x-, y-, and z-axes, as well as pitch, yaw, and roll (θx, θy, θz)). The actuators used to drive the motorized stages can include stepper motors, DC servo motors, or piezo actuators, among others. With motorized stages, the movement of the stages may be automated. For example, the computer 128 may be programmed to automatically adjust the relative position between the test object and the optical profiler while sub-aperture topography maps are obtained. Alternatively, a user may be able to enter into the computer 128 the desired position coordinates and motion for the stage.

In some implementations, the stages are manually operated instead of motorized stages. The stages then can be adjusted using fine adjustment screws and/or micrometers.

Different applications of this technology may require different staging geometries. In the following we discuss some preferred geometries for a number of applications to give an impression of the possibilities. However, the list given in this section is by no means complete since for each setup the order and breakup scheme of stacked stages can be altered, generating a large number of possible permutations. In all the examples, the objective can be moved along its optical axis in order to, e.g., bring the object into focus and/or perform the OPD scan as part of the CSI measurement principle.

In some implementations, a single additional axis of motion will be sufficient. For instance, consider the high-resolution measurement of an annulus as given by a valve seat (or many other sealing surfaces for that matter). In this case it is enough to position the objective head on a first starting patch of the annulus. Then the annulus is rotated under the sensor head to acquire multiple tiles covering the entire surface of interest.

Another application is the measurement of rod objects (e.g., cylinders with aspheric cross sections). As an example, a rod object may be too long (as measured along the cylinder axis) to be measured at once but the cross-section of the part may be small enough to fall inside the field of view and slope capture range of the optical profiler. Then it is enough to move the part or the sensor along a 1-dimensional translation axis to fully cover the part with overlapping measurements.

If the rod cross-section is outside the capture range, a combination of rod rotation, rod translation and z-sensor repositioning (e.g., repositioning along an axis parallel to the optical axis of the objective) is necessary to cover the whole part with measurements. For instance, this allows to measure cylindrical lenses with large opening angles (fast cylindrical lenses).

Figure 4:
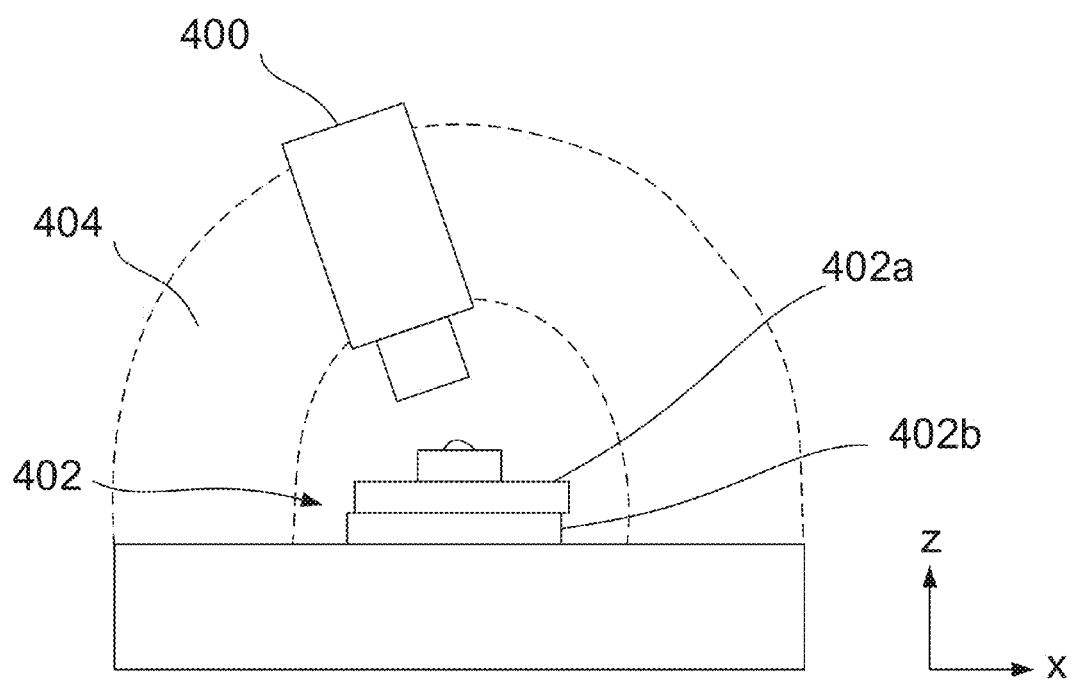
FIG. 4 is a schematic illustrating an example of the rotational path of an optical profiler sensor head and/or test object stage.

A first example of a geometry for measuring rotationally symmetric surfaces was shown in FIG. 2. An alternative example of a stage geometry for this application is shown in FIG. 4. As illustrated in the schematic of FIG. 4, an optical profiler sensor head 400 (e.g., a microscope objective) or a sample stage 402 may follow a path 404 (indicated by region within dashed lines) such that the sensor head 400 can image different sub-apertures of the test object during rotation. In the example shown in FIG. 4, the sample stage 402 includes multiple sub-stages 402a, 402b, each of which may also provide translation and/or rotation of the sample in additional directions.

The most general case is the case of free form surfaces. All other surfaces are just special cases of free form surfaces. Simple examples of free form surfaces are given by torics or biconic surfaces. One possible geometry with proper staging for this most general case would for instance use the sensor head sitting in a universal joint (cardan joint, gimbal mount) such that it can be oriented in every possible direction in space. The part underneath would be mounted onto a two-axis (x,y) stage such that the head can be positioned over every possible position on the part.

Algorithms

Besides the calibration algorithms mentioned above, the electronic processor of the optical profiler system (e.g., the electronic processor of computer 128) combines the sub-aperture topography maps together in using a stitching algorithm (see step 312 in FIG. 3). In doing so, the processor identifies a surface feature (e.g., a high-frequency surface feature) located in the overlapping regions of adjacent sub-aperture topography maps and determines the test object coordinates beyond the knowledge provided by the stages. For this, the measured surface feature is identified based on the form and texture of the test object. As a result, the requirements for highly accurate stage coordinates may be dramatically reduced.

Each sub-aperture topography map is associated with a position in three-dimensional space and can be moved around like a tile in virtual 3D space by manipulating this associated 3D position. Depending on the application and stage performance at hand, up to 6 degrees of freedom can be declared for each tile position. The different degrees of freedom correspond to the different rigid body motion parameters. For certain applications, less than 6 degrees of motion may be used, but in the most general case all 6 degrees of freedom will be used such that each tile can move unconstrained in 3D space.

In order to make the mathematical problem one with a unique solution, one can choose to remove the degrees of freedom from one of the tiles (the so-called reference tile) so that the tile is fixed in space. All others can move around the fixed reference tile. The stage coordinates known from the data acquisition phase are used to define good starting positions for all the measured sub-aperture surface maps. With proper staging, the starting positions of all tiles are already good to the equivalent of a few pixels, and in some cases even better than that.

Subsequently, a numerical optimization algorithm manipulates the tile positions (e.g., modifies the rigid body motion parameters associated with the tiles) and performs a fit to identify the best arrangement. For example, the algorithm may use a global fit, such as a global merit function. The merit function measures the match of neighboring tiles in the overlapping regions to determine a tile position and orientation corresponding to a best fit. The best fit occurs when the global merit function is minimized. The merit function may rely on, for example, the root-mean-square (RMS) difference of contributing topography maps on a pixel by pixel basis.

In some implementations, the electronic processor may implement a sequential fit from one topography map to the next adjacent map, until each of the topography maps has been fitted. For example, the optimization based on identifying a microstructure is done sequentially between adjacent tiles only, which results in intermediate rigid body parameters describing the relative position and orientation of the test object in adjacent tiles. Subsequently, a global optimization routine is performed which seeks to find the entire set of rigid body parameters for the tiles that provide the best possible compliance with the intermediate set of parameters that were determined from the sequential fitting. The global optimization in this case applies only to the intermediate rigid body parameters and does not further utilize information about the surface microstructure on the test object. To determine the best possible compliance, the optimized set of rigid body parameters are transformed into the same parameter space as the intermediate set of rigid body parameters and compared.

The sequential fitting and subsequent global optimization routine may lead to a substantial reduction of calculation time compared to a global optimization routine that has to match microstructures in all of the overlap regions at once. This is because the total number of rigid body parameters to be optimized in a sequential fitting routine is equal to the number of degrees of freedom, D, times the number of overlapping image regions, N. In contrast, the total number of parameters to be optimized when applying a global optimization to all the images at once can be much larger, requiring longer processing times. In particular, the number of parameters is determined by the product of the number of overlapping regions between adjacent tiles and the number of pixels in the overlapping regions.

Fitting techniques other than RMS fitting also may be used to stitch topography maps together including, for example, least-square fitting techniques.

Because of the steep slopes that may be associated with non-flat surfaces, the orientation of the tiles may need to be manipulated over substantial angular ranges. For example, the tiles may be pitch, yaw, or roll of a tile may be modified by at least 10 degrees or more.

Figure 5:
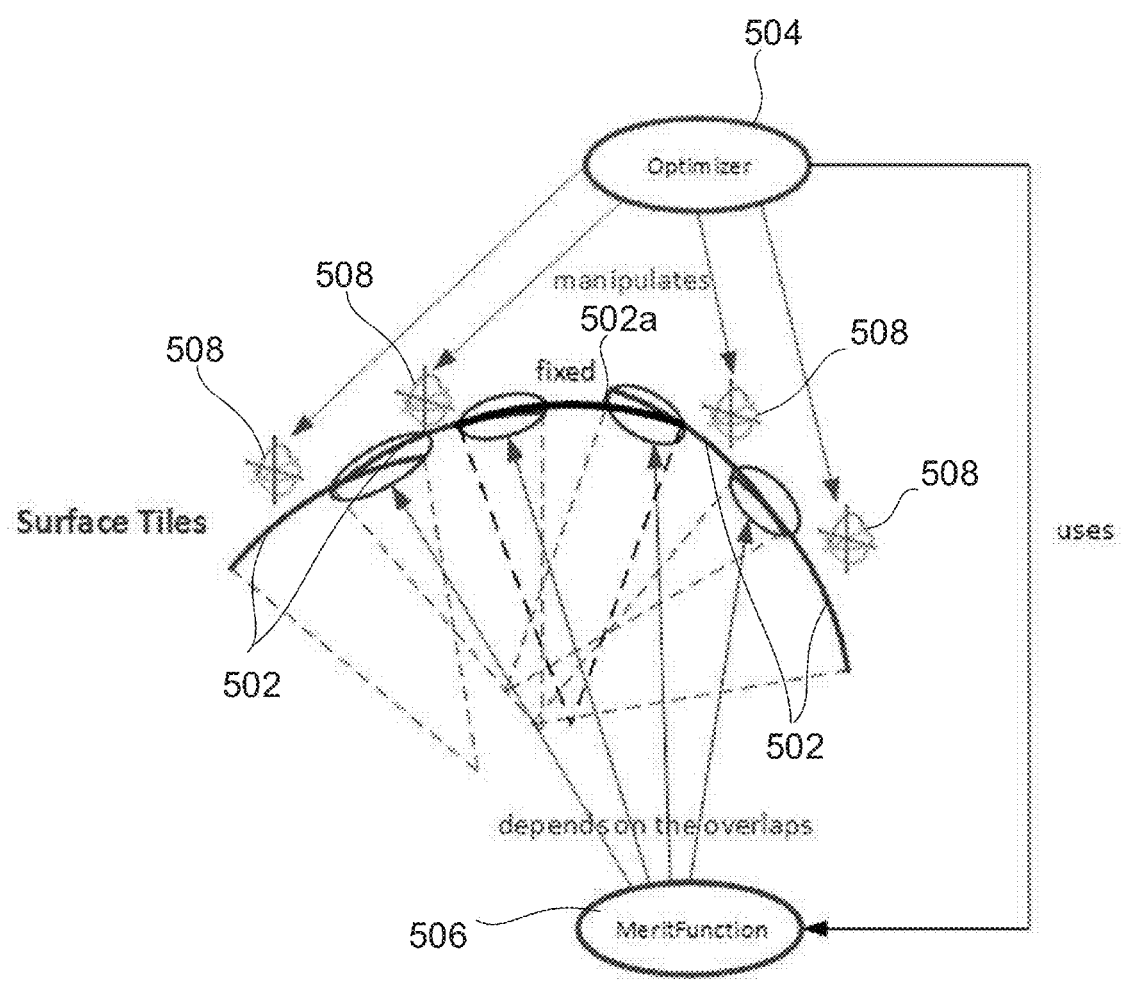
FIG. 5 is a schematic illustrating the principle of 3D-stitching using a global merit function and optimization of surface topography maps.

FIG. 5 is a schematic illustrating the principle of 3D-stitching using a global merit function and linear or nonlinear optimization of tile positions. The process shown in FIG. 5 may be performed by any appropriate computer system including, for example, the computer 128 of the optical profiler shown in FIG. 1. In the example of FIG. 5, the optical profiler has obtained a series of overlapping sub-aperture topography maps 502 (identified as "Surface Tiles" in FIG. 5), each representing a different region of the test object surface. The center map 502a is fixed while the electronic processor 504 (represented by the "optimizer") of the computer is free to manipulate the position and orientation of the other surrounding topography maps 502 (e.g., by modifying the rigid body motion parameters of the other surrounding topography maps) as noted by the multiple different axes 508 of translation/rotation for each map 502. A merit function 506 based on the difference between each point of the overlapping regions (identified by the ellipses in FIG. 5) is re-calculated for each new arrangement until the processor identifies a minimum.

In the case of the global merit function, after a minimum has been identified, the information stored by the computer now includes a set of maps with optimized 3D positions, i.e., a so-called atlas representation of the entire surface under test. Finally, the atlas representation can be rendered into a full 3D representation or, alternatively whenever appropriate a 2½-d representation of the recombined surface under test.

Then this surface result can be processed further, for instance by removing global rigid body motions or by calculating the deviation of the measured surface from a given surface design equation. Such a calculated surface deviation is the primary measurement result for many applications in surface testing and manufacturing process quality control. Other applications may require fitting numerical models to the full surface data. This is, for example, an important step in reverse-engineering applications.

In certain implementations, the choice of whether to apply a linear or nonlinear optimization of the tiles is driven by the nature of the surface being imaged. For example, topography differences in the overlapping regions of sub-aperture images caused by tip-tilt and piston errors may be linear, whereas topography differences caused by tangential shears or rotations around the surface normals may be highly nonlinear due to the randomness and the high frequency nature of the microstructures being used as markers. In some implementations, if the initial rigid body parameters are accurately determined (e.g., positions reported with <1 µm errors), the problem may become linear.

FIG. 6 is a cross-correlation plot indicating the stitching fit quality for an actual test object sample, in which the stitching relied on identification of micro roughness in the test sample. The test object in this example very smooth, having 0.06 nm RMS roughness. The micro-roughness of this test sample is an example of a high-frequency feature. Even on this very smooth part, there was enough resolvable structure available to determine the lateral shear rigid body parameters that result in the best match between the two topography maps, as indicated by the peak in the cross correlation plot. The calculations were based on two 100× 100 pixel topography maps such as the plots "measurement 1" and "measurement 2" shown to the right of the cross-correlation plot. The experiment was done using a super-polished flat measured in a special low noise measurement mode on a Zygo NewView™ CSI microscope. The instrument calibration in the experiment used to obtain the images of FIG. 6 was limited to compensation of reference mirror form errors.

Though the technique disclosed herein is useful for measuring surfaces having high slopes, the test object surface topography may include any of flat surfaces, spherical surfaces, and/or aspheric surfaces including freeform surfaces. In the case of aspheric surfaces, the test object surface may have at least two locations having respective normals that form angles including greater than 10 degrees, greater than 20 degrees, greater than 30 degrees, greater than 45 degrees, greater than 60 degrees, greater than 75 degrees, and greater than 90 degrees.

Figure 7:
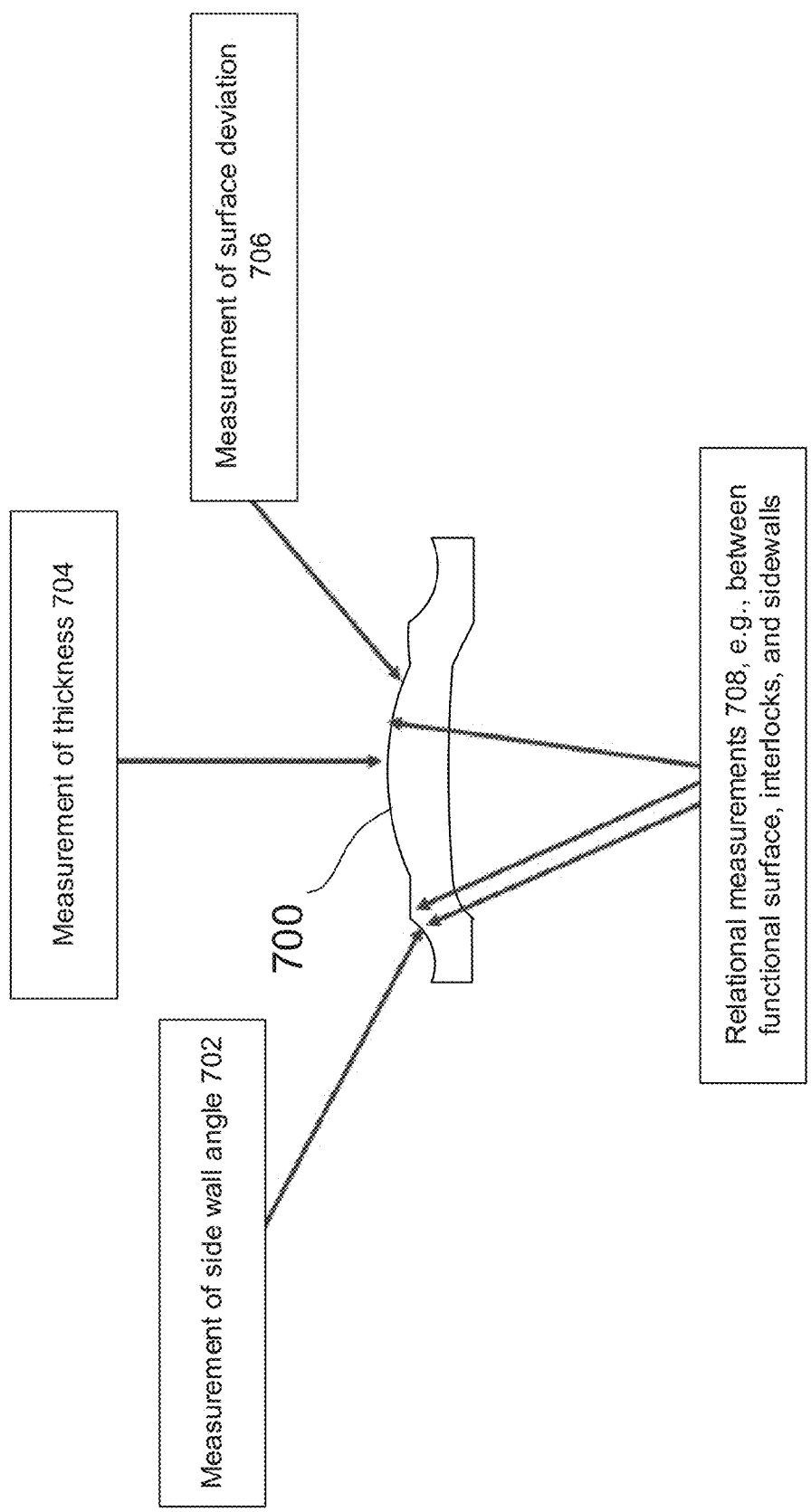
FIG. 7 is a schematic illustrating an example of a lens that can be profiled using the techniques disclosed herein.

FIG. 7 is a schematic of an example test object 700 that can be imaged using the techniques described herein. The test object 700 is a lens similar to the lenses used in mobile phone cameras. As can be seen in the example, the object 700 has both curved and planar regions oriented at substantially different angles with respect to one another. The techniques disclosed herein for 3D surface profiling can be used to measure the side wall angles between the different regions 702, the thickness of the test object at different positions 704, surface deviations 706, as well as relational measurements between different surface features 708, such as functional surface features, interlocks and sidewalls.

Additional Implementations

In some implementations, the staging used to provide relative motion between the optical profiler and the test object incorporates additional metrology to improve precision. For instance, the staging may include optical encoders or interferometers. As an example, the stage may include one or more 1D or 2D encoder gratings formed on one or more sides. Highly accurate position information about the displacement of the encoder scale, and thus the stage, may be obtained based on phase information of one or more beams that have diffracted from the encoder scale(s).

An encoder system that accurately measures changes in one or more displacement directions of an encoder scale may include: a source beam of a frequency stabilized illumination that includes two linear orthogonally polarized components having different frequencies; an optical assembly, for directing one or both components onto the encoder scale attached to the stage; an optical assembly for receiving one or both components of the diffracted beams from the encoder scale; an optical assembly for combining and mixing both frequency components to produce a heterodyne signal; a detector module including a photoelectric detector for producing an electrical measurement signal; and a phase meter for indicating the measured phase from the measurement signal. The measured phase is related to the encoder scale's diffractive structure and the displacement of the encoder scale along the sensitive directions. From the measured phase, information about the change in the stage motion up to full 3D motion (e.g., tip, tilt, translation, rotation) may be determined. Examples of encoder systems for tracking displacement are described in U.S. Pat. No. 8,300,233, entitled "INTERFEROMETRIC ENCODER SYSTEMS," to Leslie L. Deck et al., incorporated herein by reference in its entirety.

In some implementations, the method includes measuring separated surfaces and relating them to each other dimensionally. For example, the front with respect to the back surface of a transparent object, or the mounting surfaces with respect to an operational surface of the part.

The interferometric imaging system may employ other procedures to reduce errors. For example, in some embodiments, the interferometric imaging system may use technology for reducing sensitivity of measurements to vibrations. Such implementations may be particularly beneficial in environments subject to significant vibration, such as within a fabrication facility. Examples of technology for reducing vibration sensitivity of coherence scanning interferometry systems are described in U.S. Pat. No. 8,379,218, entitled "FIBER-BASED INTERFEROMETER SYSTEM FOR MONITORING AN IMAGING INTERFEROMETER," to Leslie Deck et al., and U.S. Pat. No. 8,120,781, entitled "INTERFEROMETRIC SYSTEMS AND METHODS FEATURING SPECTRAL ANALYSIS OF UNEVENLY SAMPLED DATA" to Jan Liesener, et al., each of which is incorporated herein by reference in its entirety.

Applications

The techniques described herein are broadly applicable in different areas of metrology. For example, the techniques described herein may include: performing defect inspection of lenses or lens molds used in compact imaging systems, such as the imaging systems used in mobile electronic devices (e.g., mobile phones, tablets, automotive); measuring surface topography of aspheres; measuring surface topography of rod objects like cylinders and acylinders; measuring surface topography of torics and atorics; measuring surface topography of biconics and abiconics; general characterization of free form surfaces; general 3D profiling of objects including those with discontinuous surfaces In general, any of the metrology analysis methods described above can be implemented using computer hardware or software, or a combination of both. For example, in some embodiments, an electronic processor can be part of a module that can be installed in a computer and connected to one or more interferometric imaging systems and configured to perform analysis of signals from the interferometric imaging systems (e.g., from the multi-element detector or from the transducer). Analysis can be implemented in computer programs using standard programming techniques following the method and figures described herein. Program code is applied to input data to perform the functions described herein and generate output information. The output information is applied to one or more output devices such as a video display monitor. Each program may be implemented in a high level procedural or object oriented programming language to communicate with a computer system. However, the programs can be implemented in assembly or machine language, if desired. In any case, the language can be a compiled or interpreted language. Moreover, the program can run on dedicated integrated circuits preprogrammed for that purpose.

Each such computer program is preferably stored on a storage medium or device (e.g., ROM or magnetic diskette) readable by a general or special purpose programmable computer, for configuring and operating the computer when the storage media or device is read by the computer to perform the procedures described herein. The computer program can also reside in cache or main memory during program execution. The analysis methods can also be implemented as a computer-readable storage medium, configured with a computer program, where the storage medium so configured causes a computer to operate in a specific and predefined manner to perform the functions described herein.

A number of embodiments have been described. Nevertheless, it will be understood that various modifications may be made without departing from the spirit and scope of the invention. Other embodiments are within the scope of the following claims.

What is claimed is:

1. A method of generating a composite image of a non-flat surface of a test object using a microscope, the method comprising:
   acquiring, using the microscope, a plurality of three-dimensional images of different areas of the non-flat surface, where each image comprises a region of overlap with at least one adjacent image, the microscope having sufficient resolution to image in the overlap region and in three dimensions a microstructure on the non-flat surface having a lateral dimension of 10 microns or less and a height of 10 nm or less;
   identifying, for each region of overlap, a corresponding microstructure having a lateral dimension of 10 microns or less and a height of 10 nm or less;
   determining, for each of the images, a set of rigid body parameters relating a position and an orientation of the test object in the image to a common coordinate system, where the set of rigid body parameters is determined by fitting the resolved microstructure in the overlap region in the image with the corresponding microstructure in the overlap region of the adjacent image,
   wherein fitting the resolved microstructure in the overlap region in the image with the corresponding microstructure in the overlap region of the adjacent image is performed for a series of adjacent image pairs, and
   wherein, for each adjacent image pair, the fitting results in an intermediate set of rigid body parameters relating a relative position and orientation of the test object between the images in the image pair;
   performing a global optimization to obtain a final set of rigid body parameters that best matches the intermediate sets of parameters; and
   combining the plurality of images based on the final set of rigid body parameters to generate a composite image of the surface.

2. The method of claim 1, wherein the non-flat surface comprises at least two locations having respective normals that form an angle greater than 20 degrees, greater than 30 degrees, greater than 45 degrees, or greater than 60 degrees.

3. The method of claim 1, wherein the final set of rigid body parameter comprises at least two translation coordinates and at least two angular coordinates.

4. The method of claim 1, wherein the final set of rigid body parameters comprises at least five coordinates.

5. The method of claim 4, wherein the final set of rigid body parameters comprises six coordinates.

6. The method of claim 1, wherein the final set of rigid body parameters is sufficient to relate the orientations of at least two locations of the non-flat surface to one another, wherein the at least two locations have respective normals that form an angle greater than 10 degrees, greater than 20 degrees, greater than 30 degrees, greater than 45 degrees, or greater than 60 degrees.

7. The method of claim 1, wherein the final set of rigid body parameters comprises three orthogonal rotation angles.

8. The method of claim 1, wherein the different areas of the plurality of three dimensional images comprise at least two locations having respective normals that form an angle greater than 10 degrees, greater than 20 degrees, greater than 30 degrees, greater than 45 degrees, or greater than 60 degrees.

9. The method of claim 8, wherein acquiring the images with the microscope comprises sequentially orienting that test object so that the locations have their respective normals substantially parallel to an axis of the microscope.

10. The method of claim 9, wherein the microscope comprises a mount configured to hold the test object and orient it over a range of orientations sufficient to sequentially make normals of the locations substantially parallel to the axis of the microscope.

11. The method of claim 1, wherein an area of the composite image is larger than a field of view of the microscope.

12. The method of claim 1, wherein the test object is translated relative to the microscope for successive images.

13. The method of claim 1, wherein the test object is rotated relative to the microscope for successive images.

14. The method of claim 1, wherein the test object is rotated based on a curvature of the non-flat surface to orient a portion of the non-flat surface in a field of view of the microscope appropriately for imaging using the microscope.

15. The method of claim 13, wherein a relative rotation of the test object for at least some of the images is 10° or more.

16. The method of claim 1, wherein the non-flat surface has a RMS surface roughness of 1 nm or less.

17. The method of claim 1, wherein the non-flat surface is an optically smooth surface.

18. The method of claim 1, wherein the test object is an aspheric lens.

19. The method of claim 1, wherein determining the set of rigid body parameters comprises calibrating the plurality of three-dimensional images prior to fitting resolved microstructure.

20. The method of claim 19, wherein calibrating the plurality of three-dimensional images comprises:
   acquiring, using the microscope, an image of a reference mirror; and
   subtracting the reference mirror image from each of the three-dimensional images.

21. The method of claim 19, wherein acquiring the plurality of three-dimensional images comprises detecting the images using a multi-element detector, and wherein calibrating the plurality of three-dimensional images comprises:
   detecting at the multi-element detector an image of a reference sample comprising a pre-defined periodic surface pattern;
   determining an error in a pixel pattern of the measured reference sample; and
   compensating each of the three-dimensional images for the error in the pixel pattern.

22. The method of claim 19, wherein acquiring the plurality of three-dimensional images comprises detecting the images using a multi-element detector, and wherein calibrating the plurality of three-dimensional images comprises, for each three-dimensional image:
   determining, for each pixel of the three-dimensional image, a surface slope along two orthogonal directions;
   calculating, for each pixel of the three-dimensional image, a corresponding retrace error function; and
   subtracting the retrace error function from the corresponding pixel in the three-dimensional image.

23. The method of claim 1, comprising acquiring the plurality of three-dimensional images using an optical microscope.

24. The method of claim 1, comprising acquiring the plurality of three-dimensional images using a coherence scanning interferometry microscope, a phase-shifting interferometry microscope, a confocal microscope, a focus-scanning microscope, a digital holography microscope, a structured-illumination microscope, or a chromatic confocal microscope.

25. The method of claim 1, wherein acquiring the plurality of three-dimensional images comprises using coherence scanning interferometry to obtain a topography map of each of the different areas of the non-flat surface.

26. The method of claim 1, wherein acquiring the plurality of three-dimensional images comprises using a stylus to measure a topography map of each of the different areas of the non-flat surface.

27. The method of claim 1, wherein the composite image is a three-dimensional image.

28. A system for generating a composite image of a non-flat surface of a test object, the system comprising:
   a microscope, the microscope having a resolution sufficient to image in three dimensions a microstructure on the non-flat surface having a lateral dimension of 10 microns or less and a height of 10 nm or less;
   a stage for arranging the test object relative to the microscope, the stage having at least one rotational degree of freedom relative to the microscope and having an angular range of 10° or more for varying an angular orientation of the test object relative to the microscope; and
   an electronic processor in communication with the microscope,
   wherein during operation the microscope acquires a plurality of three-dimensional images of different areas of the non-flat surface, where each image comprises a region of overlap with at least one adjacent image and at least some of the images are acquired for different angular orientations of the test object with respect to the objective, and
   the electronic processor being programmed
      to receive the images from the microscope,
      to identify, for each region of overlap, a corresponding microstructure having a lateral dimension of 10 microns or less and a height of 10 nm or less,
      to determine, for each of the images, a set of rigid body parameters relating a position and orientation of the test object to a common coordinate system, where the set of rigid body parameters is determined by a) fitting the resolved microstructure in the overlap region in the image with the corresponding microstructure in the overlap region of the adjacent image for a series of adjacent image pairs, wherein for each adjacent image pair, the fitting results in an intermediate set of rigid body parameter relating a relative position and orientation of the test object between the images in the image pair, and b) performing a global optimization to obtain a final set of rigid body parameters that best matches the intermediate sets of parameters, and
      to combine the plurality of images based on the final set of rigid body parameters to generate a composite image of the surface.

29. The system of claim 28, wherein the final set of rigid body parameter comprises at least two translation coordinates and at least two angular coordinates.

30. The system of claim 28, wherein the final set of rigid body parameters comprises at least five coordinates.

31. The system of claim 28, wherein the final set of rigid body parameters comprises six coordinates.

32. The system of claim 28, wherein the final set of rigid body parameters is sufficient to relate the orientations of at least two locations of the non-flat surface to one another, wherein the at least two locations have respective normals that form an angle greater than 10 degrees, greater than 20 degrees, greater than 30 degrees, greater than 45 degrees, or greater than 60 degrees.

33. The system of claim 32, wherein the microscope is configured to acquire the plurality of three-dimensional images by sequentially orienting that test object so that the locations of the non-flat surface object have their respective normals substantially parallel to a measurement axis of the microscope.

34. The system of claim 33, wherein the microscope and the stage are configured to orient the test object over a range of orientations sufficient to sequentially make normals of locations on the test object substantially parallel to the optical axis of the microscope.

35. The system of claim 28, wherein the microscope and stage are configured to translate the test object relative to each other between successive images of the plurality of three-dimensional images.

36. The system of claim 35, wherein the stage comprises one or more actuators for translating the test object relative to the microscope.

37. The system of claim 28, wherein the microscope and stage are configured to rotate the test object relative to each other between successive images of the plurality of three-dimensional images.

38. The system of claim 37, wherein the stage comprises one or more actuators for rotating the test object relative to the microscope.

39. The system of claim 28, wherein the microscope further comprises a multi-element detector for detecting the plurality of three-dimensional images, and wherein the processor is configured to calibrate the plurality of three-dimensional images detected by the multi-element detector.

40. The system of claim 28, wherein the microscope is an optical microscope.

41. The system of claim 28, wherein the microscope is a CSI microscope.

42. The system of claim 28, wherein the microscope is a PSI microscope, a confocal microscope, a focus-scanning microscope, a digital holography microscope, a structured-illumination microscope, or a chromatic confocal microscope.

43. The system of claim 28, wherein the microscope comprises a stylus configured to measure a topography map of the test object.

44. The system of claim 28, wherein the microscope comprises a first sensor configured to detect the microstructure and a second sensor configured to detect a surface form of the test object.

45. The system of claim 28, wherein the composite image is a three-dimensional image.

* * * * *

UNITED STATES PATENT AND TRADEMARK OFFICE
CERTIFICATE OF CORRECTION

PATENT NO. : 9,798,130 B2
APPLICATION NO. : 14/592437
DATED : October 24, 2017
INVENTOR(S) : Thomas Dresel, Jan Liesener and Peter J. de Groot Page 1 of 1

It is certified that error appears in the above-identified patent and that said Letters Patent is hereby corrected as shown below:

In the Claims

<u>Column 23</u>
Lines 6-7, in Claim 9, delete "sequentially orienting that test" and insert -- sequentially orienting the test --

Signed and Sealed this
Twenty-fifth Day of September, 2018

Andrei Iancu
*Director of the United States Patent and Trademark Office*